United States Patent [19]

Hicks et al.

[11] Patent Number: 5,629,403

[45] Date of Patent: May 13, 1997

[54] COATING COMPOSITIONS CONTAINING POLYISOCYANATES AND ALDIMINES WHICH HAVE IMPROVED STORAGE STABILITY

[75] Inventors: Sharon D. Hicks, Pittsburgh; Douglas A. Wicks, Mt. Lebanon; Philip E. Yeske, Pittsburgh, all of Pa.

[73] Assignee: Bayer Corporation, Pittsburgh, Pa.

[21] Appl. No.: 359,961

[22] Filed: Dec. 20, 1994

Related U.S. Application Data

[63] Continuation of Ser. No. 171,304, Dec. 21, 1993, abandoned.

[51] Int. Cl.$^6$ ................................................. C08G 18/08
[52] U.S. Cl. ........................... 528/48; 528/49; 528/52; 528/59
[58] Field of Search ................................ 528/48, 49, 52, 528/59

[56] References Cited

U.S. PATENT DOCUMENTS

| | | |
|---|---|---|
| 3,420,800 | 1/1969 | Haggis . |
| 3,567,692 | 3/1971 | Haggis et al. . |
| 5,243,012 | 9/1993 | Wicks et al. ................................ 528/58 |

OTHER PUBLICATIONS

"One Component Polyurethane Elastomers Based on Novel Polyaldimine", Polyurethanes World Congress 1993–Oct. 10–13, 1993, pp. 341–345, M. Aoki et al.

Huls—Vestamin A 139—Production Information Bulletin Jul. 1992.

*Primary Examiner*—James J. Seidleck
*Assistant Examiner*—John M. Cooney, Jr.
*Attorney, Agent, or Firm*—Joseph C. Gil; Thomas W. Roy

[57] ABSTRACT

The present invention relates to a coating composition having an improved pot life without a corresponding increase in dry time when cured under ambient conditions which contains a) a polyisocyanate component,
b) an aldimine based on the reaction product of a polyamine having 2 or more primary amino groups with an aldehyde corresponding to the formula:

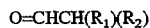

wherein $R_1$ and $R_2$ may be the same or different and represent optionally substituted hydrocarbon radicals, or $R_1$ and $R_2$ together with the β-carbon atom form a cycloaliphatic or heterocyclic ring and c) 0.001 to 5 weight percent, based on the weight of components a) and b), of a tin(IV) compound which is a catalyst for the reaction between isocyanate groups and hydroxyl groups, wherein components a) and b) are present in an amount sufficient to provide an equivalent ratio of isocyanate groups to aldimine groups of 0.5:1 to 20:1.

18 Claims, No Drawings

COATING COMPOSITIONS CONTAINING POLYISOCYANATES AND ALDIMINES WHICH HAVE IMPROVED STORAGE STABILITY

This application is a continuation of application Ser. No. 08/171,304 filed Dec. 21, 1993, which is now abandoned.

BACKGROUND OF THE INVENTION

1. Field of the Invention

The present invention is directed to coating compositions based on polyisocyanates and aldimines which have improved pot lives without a corresponding increase in dry times due to the presence of compounds which are catalysts for the reaction between isocyanate groups and hydroxyl groups.

2. Description of the Prior Art

Coating compositions which may be cured at room temperature are known. One-component coating compositions contain fully reacted polyurethanes as the binder. These compositions have the advantage that they are available as fully formulated systems which may be directly applied to suitable substrates without any preliminary steps except for mild stirring. Disadvantages of these systems are that large amounts of organic solvents are needed to reduce the viscosity of fully reacted, i.e., high molecular weight, polyurethanes. The coating compositions are cured by evaporation of the solvent which is objectionable from an environmental perspective. In addition, in order to solubilize the polyurethanes in organic solvents, they must be essentially linear polyurethanes. While such polyurethanes possess properties which are suitable for many applications, they do not provide certain properties, e.g., solvent resistance which may be obtained from crosslinked polyurethanes.

Two-component coating compositions are also known. These compositions come in two containers. The first contains a polyisocyanate, while the second contains an isocyanate-reactive component, generally a polyol. The components are not mixed until they are ready to be used. One advantage of these compositions is that because the components are not pre-reacted to form a high molecular weight polymer, a suitable processing viscosity can be achieved without the need for large amounts of organic solvents. In addition, higher functional components can be used to obtain highly crosslinked coatings which possess properties which surpass those possessed by one-component coatings.

The disadvantages of these compositions is that they cannot be applied without a preliminary mixing step in which it is critical that the components are mixed in the right proportions. In addition, special metering and mixing equipment is needed to conduct this process on a commercial scale. If the components are mixed in the wrong proportions, then the properties of the resulting coatings can be substantially affected. In addition, after the components are mixed they must be used in a timely fashion. If not, they continue to react until an unusable solid is obtained.

Coating compositions which possess the advantages of the known one- and two-component coating compositions without possessing their disadvantages have been disclosed in copending application, Attorney's Docket No. MD-93-108-IC. Even though coatings prepared in accordance with the copending application possess many desirable properties, further improvements are needed in the pot lives of the compositions. The viscosity of these compositions increases too rapidly prior to being applied to a substrate and cured.

Accordingly, it is an object of the present invention to provide increased pot lives without significantly increasing the dry times of the coating compositions and without altering any of the other desirable properties of the compositions.

Surprisingly, this object may be achieved with the coating compositions of the present invention which contain polyisocyanates and aldimines and also certain tin compounds to be described hereinafter. It is surprising that an increase in the pot life can be obtained by incorporating these tin compounds because they are generally regarded as catalysts for polyisocyanate polyaddition reactions and, thus, would be expected to shorten the pot life of the coating compositions.

U.S. Pat. Nos. 3,420,800 and 3,567,692 disclose coating compositions containing polyisocyanates and either aldimines or ketimines. However, these patents do not teach the use of tin compounds to increase the pot life. In addition, U.S. Pat. No. 5,243,012 teaches that tin compounds may be used to increase the pot life of coating compositions containing polyisocyanates and polyaspartic acid derivatives that contain secondary amino groups.

SUMMARY OF THE INVENTION

The present invention relates to a coating composition having an improved pot life without a corresponding increase in dry time when cured under ambient conditions which contains a) a polyisocyanate component, b) an aldimine based on the reaction product of a polyamine having 2 or more primary amino groups with an aldehyde corresponding to the formula:

wherein $R_1$ and $R_2$ may be the same or different and represent optionally substituted hydrocarbon radicals, or $R_1$ and $R_2$ together with the β-carbon atom form a cycloaliphatic or heterocyclic ring and c) 0.001 to 5 weight percent, based on the weight of components a) and b), of a tin(IV) compound which is a catalyst for the reaction between isocyanate groups and hydroxyl groups, wherein components a) and b) are present in an amount sufficient to provide an equivalent ratio of isocyanate groups to aldimine groups of 0.5:1 to 20:1.

DETAILED DESCRIPTION OF THE INVENTION

Examples of suitable polyisocyanates which may be used as the polyisocyanate component in accordance with the present invention include monomeric diisocyanates, preferably NCO prepolymers and more preferably polyisocyanate adducts. Suitable monomeric diisocyanates may be represented by the formula

in which R represents an organic group obtained by removing the isocyanate groups from an organic diisocyanate having a molecular weight of about 112 to 1,000, preferably about 140 to 400. Diisocyanates preferred for the process according to the invention are those represented by the above formula in which R represents a divalent aliphatic hydrocarbon group having 4 to 18 carbon atoms, a divalent cycloaliphatic hydrocarbon group having 5 to 15 carbon atoms, a divalent araliphatic hydrocarbon group having 7 to 15 carbon atoms or a divalent aromatic hydrocarbon group having 6 to 15 carbon atoms.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-iso-cyanatocyclohexyl)-methane, 2,4'-dicyclohexylmethane diisocyanate, 1,3- and 1,4-bis-(isocyanatomethyl)-cyclohexane, bis-(4-isocyanato-3-methyl-cyclohexyl)-methane, α,α,α',α'-tetramethyl-1,3- and/or -1,4-xylylene diisocyanate, 1-isocyanato-1-methyl-4 (3)-isocyanatomethyl cyclohexane, 2,4- and/or 2,6-hexahydrotoluylene diisocyanate, 1,3- and/or 1,4-phenylene diisocyanate, 2,4- and/or 2,6-toluylene diisocyanate, 2,4- and/or 4,4'-diphenylmethane diisocyanate, 1,5-diisocyanato naphthalene and mixtures thereof. Aromatic polyisocyanates containing 3 or more isocyanate groups such as 4,4',4"-triphenylmethane diisocyanate and polyphenyl polymethylene polyisocyanates obtained by phosgenating aniline/formaldehyde condensates may also be used.

In accordance with the present invention the polyisocyanate component is preferably in the form of an NCO prepolymer or a polyisocyanate adduct, more preferably a polyisocyanate adduct. Suitable polyisocyanate adducts are those containing isocyanurate, uretdione, biuret, urethane, allophanate, carbodiimide and/or oxadiazinetrione groups. The polyisocyanates adducts have an average functionality of 2 to 6 and an NCO content of 5 to 30% by weight.

1) Isocyanurate group-containing polyisocyanates which may be prepared as set forth in DE-PS 2,616,416, EP-OS 3,765, EP-OS 10,589, EP-OS 47,452, U.S. Pat. No. 4,288, 586 and U.S. Pat. No. 4,324,879. The isocyanato-isocyanurates generally have an average NCO functionality of 3 to 3.5 and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a trialkyl phosphine catalyst and which may be used in admixture with other aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906, 126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 21% by weight and an (average) NCO functionality of 2 to 4.5.

6) Isocyanurate and allophanate group-containing polyisocyanates which may be prepared in accordance with the processes set forth in U.S. Pat. Nos. 5,124,427, 5,208,334 and 5,235,018; the disclosures of which are herein incorporated by reference.

7) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

8) Polyisocyanates containing oxadiazinetrione groups and containing the reaction product of two moles of a diisocyanate and one mole of carbon dioxide.

Preferred polyisocyanate adducts are the polyisocyanates containing isocyanurate groups, biuret groups or mixtures of isocyanurate and allophanate groups.

The NCO prepolymers, which may also be used as the polyisocyanate component in accordance with the present invention, are prepared from the previously described monomeric polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 400 to about 6,000, preferably 800 to about 3,000, and optionally low molecular weight compounds with molecular weights below 400. The molecular weights are number average molecular weights ($M_n$) and are determined by end group analysis (OH number). Products obtained by reacting polyisocyanates exclusively with low molecular weight compounds are polyisocyanates adducts containing urethane groups and are not considered to be NCO prepolymers.

Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred. Further details concerning the low molecular weight compounds and the starting materials and methods for preparing the high molecular weight polyhydroxy compounds are disclosed in U.S. Pat. No. 4,701,480, herein incorporated by reference.

These NCO prepolymers generally have an isocyanate content of about 0.5 to 30% by weight, preferably about 1 to 20% by weight, and are prepared in known manner by the reaction of the above mentioned starting materials at an NCO/OH equivalent ratio of about 1.05:1 to 10:1 preferably about 1.1:1 to 3:1. This reaction may take place in a suitable solvent which may optionally be removed by distillation after the reaction along with any unreacted volatile starting polyisocyanates still present. In accordance with the present invention NCO prepolymers also include NCO semi-prepolymers which contain unreacted starting polyisocyanates in addition to the urethane group-containing prepolymers.

As disclosed in copending application, Attorney's Docket No. MD-93-116-IC, the compatibility between the polyisocyanates and the aldimines as well as the optical properties of the resulting coatings may be improved by the use of polyisocyanates containing a monoallophanate group, i.e., a polyisocyanate containing one allophanate group and formed from two isocyanate molecules and 1 monoalcohol molecule. In mixtures with monomeric polyisocyanates, polyisocyanate adducts or NCO prepolymers, the polyisocyanates containing allophanate groups should be present in an amount of at least 5% by weight, preferably at least 25% by weight and more preferably at least 40% by weight, based on the solids content of the polyisocyanate component.

Suitable aldimines for use in combination with the polyisocyanate mixtures include those prepared from an aldehyde and polyamines containing two or more, preferably 2 to 6 and more preferably 2 to 4, primary amino groups. The polyamines include high molecular weight amines having molecular weights of 400 to about 10,000, preferably 800 to about 6,000, and low molecular weight amines having molecular weights below 400. The molecular weights are number average molecular weights ($M_n$) and are determined by end group analysis (NH number). Examples of these polyamines are those wherein the amino groups are attached to aliphatic, cycloaliphatic, araliphatic and/or aromatic carbon atoms.

Suitable low molecular polyamines starting compounds include tetramethylene diamine, ethylene diamine, 1,2- and 1,3-propane diamine, 2-methyl-1,2-propane diamine, 2,2-dimethyl-1,3-propane diamine, 1,3- and 1,4-butane diamine, 1,3-and 1,5-pentane diamine, 2-methyl-1,5-pentane diamine, 1,6-hexane diamine, 1,7-heptane diamine, 1,8-octane diamine, 1,9-nonane diamine, 1,10-decane diamine, 1,11-dodecane diamine, 1-amino-3-aminomethyl-3,5,5-trimethyl cyclohexane, bis-(4-aminocyclohexyl)-methane, bis-(4-amino-3-methylcyclohexyl)methane, 1,2- and/or 1,4-cyclohexane diamine, 1,3-bis(methylamino)cyclohexane, 1,8-p-menthane diamine, hydrazine, hydrazides of semicarbazido carboxylic acids, bis-hydrazides, bis-semicarbazides, phenylene diamine, 2,4- and 2,6-toluylene diamine, 2,3- and 3,4-toluylene diamine, polyphenylene polymethylene polyamines of the kind obtained by the aniline/formaldehyde condensation reaction, N,N,N-tris-(2-aminoethyl)-amine, guanidine, melamine, N-(2-aminoethyl)-1,3-propane diamine, 3,3'-diamino-benzidine, polyoxypropylene amines, polyoxyethylene amines, 2,4-bis-(4'-aminobenzyl)-aniline and mixtures thereof.

Preferred polyamines are 1-amino-3-aminomethyl-3,5,5-trimethyl-cyclohexane (isophorone diamine or IPDA), bis-(4-aminocyclohexyl)-methane, bis-(4-amino-3-methylcyclohexyl)-methane, 1,6-diaminohexane, 2-methyl pentamethylene diamine and ethylene diamine.

Suitable high molecular weight polyamines correspond to the polyhydroxyl compounds used to prepare the NCO prepolymers with the exception that the terminal hydroxy groups are converted to amino groups, either by amination or by reacting the hydroxy groups with a diisocyanate and subsequently hydrolyzing the terminal isocyanate group to an amino group. Preferred high molecular weight polyamines are amine-terminated polyethers such as the Jeffamine resins available from Texaco.

Suitable aldehydes are those corresponding to the formula

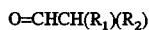

wherein $R_1$ and $R_2$ may be the same or different and represent optionally substituted hydrocarbon radicals, preferably containing 1 to 10, more preferably 1 to 6, carbon atoms, or $R_1$ and $R_2$ together with the β-carbon atom form a cycloaliphatic or heterocyclic ring.

Examples of suitable aldehydes include isobutyraldehyde, 2-ethyl hexanal, 2-methyl butyraldehyde, 2-ethyl butyraldehyde, 2-methyl valeraldehyde, 2,3-dimethyl valeraldehyde, 2-methyl undecanal and cyclohexane carboxyaldehyde.

The aldimines may be prepared in known manner by reacting the polyamines with the aldehydes either in stoichiometric amounts or with an excess of aldehyde. The excess aldehyde and the water which is produced can be removed by distillation. The reactions may also be carried out in solvents, other than ketones. The solvents may also be removed by distillation after completion of the reaction.

Suitable tin compounds c) include tin(IV) compounds which are catalysts for the reaction between isocyanate groups and hydroxyl groups, i.e., compounds which increase the reaction rate between isocyanate groups and hydroxyl groups when compared to the reaction of these groups in the absence of a catalyst, preferably by a factor of at least 10, more preferably by a factor of at least 100 and most preferably by a factor of at least 200.

Suitable tin(IV) compounds include organotin(IV) compounds containing ester, sulfide, bisulfide, thiol and/or halide groups, preferably dialkyl tin(IV) compounds containing at least one of these groups. Examples of these compounds include dibutyltin diacetate (T-1, available from Air Products), dibutyltin sulfide (T-5, available from Air Products), dibutyltin dilaurate (T-12, available from Air Products), dibutyltin mercaptide (T-120, available from Air Products), dibutyltin diester (T-125, available from Air Products), and dibutyltin bis-mercaptide (T-131, available from Air Products). Also suitable, though less preferred, are tetraalkyl tin compounds such as tetramethyl tin.

In accordance with the present invention the tin(IV) compounds which are the most effective catalysts for the reaction between isocyanate groups and hydroxyl groups, i.e., those which accelerate the reaction by a factor of at least 200, are the most effective additives for suppressing the reaction between components a) and b). Tin(IV) compounds which are very weak urethane catalysts such as tetramethyl tin are also less effective for suppressing the reaction between components a) and b), although the effect is still present.

The binders present in the coating compositions according to the invention contain polyisocyanate component a), aldimine component b) and tin compound c). Components a) and b) are used in amounts sufficient to provide an equivalent ratio of isocyanate groups to aldimine groups of 0.5:1 to 20:1, preferably 0.8:1 to 3:1 and more preferably 1:1 to 2:1. Tin(IV) compound c) is present in an amount of 0.001 to 5 weight percent, preferably 0.01 to 1 weight percent and more preferably 0.05 to 0.5 weight percent, based on the weight of components a) and b).

The binders to be used according to the invention are prepared by mixing all of the individual components together or by premixing two of the components before adding the third component. For example, tin compound c) may be initially blended with the component a) or component b) before the addition of the other component. As demonstrated by the following examples, premixing component c) with component a) actually enhances the suppression in reaction rate which may be obtained in accordance with the invention.

In addition to the binder components and component c), the coating compositions may also contain the known additives from coatings technology, such as fillers, pigments, softeners, high-boiling liquids, catalysts, UV stabilizers, anti-oxidants, microbiocides, algicides, dehydrators, thixotropic agents, wetting agents, flow enhancers, matting agents, anti-slip agents, aerators and extenders. The additives are chosen based on the requirements of the particular application and their compatibility with components a) and b). The coating compositions may be applied to the substrate to be coated by conventional methods such as painting, rolling, pouring or spraying.

The coating compositions according to the invention have good storage stability and provide coatings which have relatively fast dry times. The coatings are also characterized by high hardness, elasticity, very good resistance to chemicals, high gloss, good weather resistance, good environmental etch resistance and good pigmenting qualities.

The invention is further illustrated, but is not intended to be limited by the following examples in which all parts and percentages are by weight unless otherwise specified.

EXAMPLES

Polyisocyanate 1

To a 500 ml 3-neck flask equipped with a gas bubbler, mechanical stirrer, thermometer and condenser were added 301.7 grams of hexamethylene diisocyanate and 13.3 grams of 1-butanol. Dry nitrogen was bubbled through the stirred reaction mixture while it was heated at 60° C. When the urethane reaction was complete (about 1 hour), the temperature was raised to 90° C. To the reaction mixture at 90° C. were added 0.214 parts of a 4.4% solution of trimethylbenzylammonium hydroxide dissolved in 1-butanol. The reaction temperature was maintained at 90° to 100° C. When the reaction mixture reached NCO contents of 40.1% and 37.0%, an additional 0.12 parts of the catalyst solution was added. When the reaction mixture reached an NCO content of 34.8%, the reaction was stopped by adding 0.214 parts of di-(2-ethylhexyl) phosphate. The excess monomer was removed by thin film evaporation to provide an almost colorless, clear liquid having a viscosity of 630 mPa.s (25° C.), an NCO content of 19.7%, and a free monomer (HDI) content of 0.35%. The yield was 48.6%. The yield was calculated by determining the percentage of free hexamethylene diisocyanate in the product prior to distillation.

Polyisocyanate 2

An isocyanurate group-containing polyisocyanate prepared from 1,6-hexamethylene diisocyanate and having an isocyanate content of 21.6%, a content of monomeric diisocyanate of <0.2% and a viscosity at 20° C. of 3000 mPa.s (available from Miles Inc. as Desmodur N 3300).

Aldimine 1

The aldimine of bis-(4-aminocyclohexyl)-methane and isobutyraldehyde was prepared by initially charging 1514.3 parts (21 equivalents) of isobutyraldehyde and then slowly charging 2104.0 parts (20 equivalents) of bis-(4-aminocyclohexyl)-methane over a period of thirty minutes to avoid an exotherm. After the addition of the diamine the reaction mixture was stirred for one hour. At this time stirring was stopped and water was allowed to settle to the bottom of the reactor. As much water as possible was drained from the bottom of the reactor. The reaction mixture was then heated to 100° C. to remove excess isobutyraldeyde. While maintaining a temperature of 100° C., a vacuum of approximately 20 mm Hg was applied to remove any final traces of aldehyde. Thereafter the vacuum was increased to 1 mm Hg to remove water until the water content was less than 0.05% (approximately 1 to 3 hours.) The aldimine had a viscosity of 100 mPa.s at 25° C., an equivalent weight of 159.3, an APHA color of 70, a purity as determined by GPC of 93.5% and a water content of less than 0.05%.

Aldimine 2

The aldimine of 2-methyl pentamethylene diamine and isobutyraldehyde was prepared using the procedure described for aldimine 1.

Additive 1
  Dibutyltin diacetate (T-1, available from Air Products)
Additive 2
  Dibutyltin sulfide (T-5, available from Air Products)
Additive 3
  Dibutlytin dilaurate (T-12, available from Air Products)
Additive 4
  Dibutlytin mercaptide (T-120, available from Air Products)
Additive 5
  Triethylene diamine (DABCO 33LV, available from Air Products)

Preparation of Coating Compositions for Tables 1-5

To prepare the coating compositions, 1.0 equivalent of the imine, the additive in an amount sufficient to provide 0.1%, based on resins solids), 1.1 equivalents of the polyisocyanate set forth in Table 3, and sufficient n-butyl acetate to obtain a coating composition having a volatile organic content (VOC) of 2.0 lbs/gal were added sequentially to a 6 oz. container and stirred for one minute. After stirring a 3 mil drawdown on glass was immediately prepared and the resulting film was placed in a 23° C./50% relative humidity chamber with a 6 hour and a 1 hour Gardner Drytime recorder on the film. The Gardner dry time was determined using a Gardner Circular Drying Time Recorder.

Set-to-touch—During the first stage of drying the film is mobile and partially flows back into the scribed channel. The film may be considered "set-to-touch" when it no longer flows back and the stylus begins to leave a clear channel.

Surface-dry—when sytlus no longer leaves clear channel, but begins to rupture the dry upper layer of the curing film, the film is considered to be "surface-dry."

Hard-dry—when the stylus no longer ruptures the film, but moves freely upon the surface, the cross-section of the film may be considered to have reached the "hard-dry" condition.

Mar-free—When the stylus no longer mars the surface of the film at all the film may be considered to be "mar-free."

The remainder of the coating composition was monitored for viscosity buildup using a Brookfield LVT Viscometer, #2 spindle, 60 rpm. The results for the viscosity buildup are set forth in Tables 1 and 2, while the dry times are set forth in Tables 3 and 4.

TABLE 1

Comparison of Pot Life of Aldimines with and Without Tin IV compounds in Coating Compositions Containing Polyisocyanate 1 and Aldimine 1

| Additive | Viscosity (mPa · s) | | | | | | |
|---|---|---|---|---|---|---|---|
| | initial | 1 hr | 4 hr | 8 hr | 24 hr | 48 hr | 192 hr |
| None (Comp) | 15 | 18 | 25 | 25 | 30 | 43 | 108 |
| 1 | 15 | 15 | 18 | 20 | 19 | 22 | 28 |
| 2 | 15 | 18 | 18 | 20 | 23 | 25 | 33 |
| 3 | 15 | 16 | 18 | 18 | 18 | 20 | 28 |
| 4 | 15 | 17 | 18 | 22 | 23 | 25 | 35 |
| 5 (Comp) | 15 | 18 | 23 | 28 | 43 | 70 | 330 |

TABLE 2

Comparison of Pot Life of Aldimines With and Without Tin IV compounds in Coating Compositions Containing Polyisocyanate 1 and Aldimine 2

| Additive | Viscosity (mPa · s) | | | | | | |
|---|---|---|---|---|---|---|---|
| | initial | 1 hr | 4 hr | 8 hr | 24 hr | 48 hr | 192 hr |
| None (Comp) | 23 | 27 | 35 | 45 | 83 | 158 | 4600 |
| 1 | 23 | 30 | 28 | 30 | 30 | 38 | 105 |
| 2 | 23 | 21 | 28 | 35 | 45 | 58 | 80 |
| 3 | 23 | 27 | 25 | 29 | 33 | 35 | 93 |
| 4 | 23 | 25 | 28 | 33 | 39 | 45 | 60 |
| 5 (Comp) | 23 | 27 | 33 | 40 | 90 | 190 | 3480 |

TABLE 3

Comparison of Dry Times of Aldimines with and Without Tin IV compounds in Coating Compositions Containing Polyisocyanate 1 and Aldimine 1

| Additive | Gardner Dry Time (minutes) | | | |
|---|---|---|---|---|
| | Set to Touch | Surface Dry | Hard Dry | Mar Free |
| None (Comp) | 30 | 60 | 68 | 90 |
| 1 | 20 | 40 | 45 | 80 |
| 2 | 22 | 50 | 55 | 85 |
| 3 | 25 | 30 | 40 | 70 |
| 4 | 30 | 75 | 90 | 165 |
| 5 (Comp) | 25 | 50 | 65 | 120 |

TABLE 4

Comparison of Dry Times of Aldimines with and Without Tin IV compounds in Coating Compositions Containing Polyisocyanate 1 and Aldimine 2

| Additive | Gardner Dry Time (minutes) | | | |
|---|---|---|---|---|
| | Set to Touch | Surface Dry | Hard Dry | Mar Free |
| None (Comp) | 25 | 45 | 55 | 70 |
| 1 | 20 | 30 | 38 | 50 |
| 2 | 25 | 32 | 45 | 60 |
| 3 | 30 | 38 | 50 | 50 |
| 4 | 25 | 32 | 40 | 50 |
| 5 (Comp) | 20 | 30 | 45 | 60 |

Tables 1–4 demonstrate that coating compositions containing aldimines and tin IV compounds exhibit longer pot lives without a corresponding increase in dry times when compared to coating compositions which do not contain tin IV compounds.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition which has an improved pot life without a corresponding increase in dry time when cured under ambient conditions comprising
   a) a polyisocyanate component,
   b) an aldimine based on the reaction product of a polyamine having 2 or more primary amino groups with an aldehyde corresponding to the formula:

$$O=CHCH(R_1)(R_2)$$

wherein $R_1$ and $R_2$ may be the same or different and represent optionally substituted hydrocarbon radicals, or $R_1$ and $R_2$ together with the β-carbon atom form a cycloaliphatic or heterocyclic ring and
   c) 0.001 to 5 weight percent, based on the weight of components a) and b), of a tin(IV) compound which is a catalyst for the reaction between isocyanate groups and hydroxyl groups, wherein components a) and b) are present in an amount sufficient to provide an equivalent ratio of isocyanate groups to aldimine groups of 0.5:1 to 20:1.

2. The composition of claim 1 wherein said polyisocyanate is a polyisocyanate adduct.

3. The composition of claim 1 wherein said polyisocyanate is a polyisocyanate adduct containing monoisocyanurate and monoallophanate groups in a ratio of 10:1 to 1:10.

4. The composition of claim 1 wherein $R_1$ and $R_2$ are hydrocarbon radicals containing 1 to 6 carbon atoms.

5. The composition of claim 4 wherein said diamine comprises bis-(4-aminocyclohexyl)-methane.

6. The composition of claim 1 wherein the tin(IV) compound which increases the reaction rate between isocyanate and hydroxyl groups by a factor of 100 when compared to the reaction of these groups in the absence of a catalyst.

7. A coating composition which has an improved pot life without a corresponding increase in dry time when cured under ambient conditions comprising
   a) a polyisocyanate component,
   b) an aldimine based on the reaction product of a polyamine having 2 or more primary amino groups with an aldehyde corresponding to the formula:

$$O=CHCH(R_1)(R_2)$$

wherein $R_1$ and $R_2$ may be the same or different and represent hydrocarbon radicals containing 1 to 6 carbon atoms and
   c) 0.001 to 5 weight percent, based on the weight of components a) and b), of a dialkyl tin(IV) compound which contains a group selected from the group consisting of ester, sulfide, bisulfide, thiol and/or halide groups and which increases the reaction rate between isocyanate and hydroxyl groups by a factor of 100 when present in an amount of 1 mole percent in comparison to the reaction of these groups in the absence of a catalyst, wherein components a) and b) are present in an amount sufficient to provide an equivalent ratio of isocyanate groups to aldimine groups of 0.5:1 to 20:1.

8. The composition of claim 7 wherein said polyisocyanate is a polyisocyanate adduct.

9. The composition of claim 7 wherein said polyisocyanate is a polyisocyanate adduct containing monoisocyanurate and monoallophanate groups in a ratio of 10:1 to 1:10.

10. The composition of claim 7 wherein $R_1$ and $R_2$ are hydrocarbon radicals containing 1 to 6 carbon atoms.

11. The composition of claim 10 wherein said diamine comprises bis-(4-aminocyclohexyl)-methane.

12. The composition of claim 7 wherein the proportions of components a) and b) are calculated to provide an equivalent ratio of isocyanate groups of component a) to isocyanate-reactive groups of component b) of about 0.8:1 to 3:1.

13. A coating composition which has an improved pot life without a corresponding increase in dry time when cured under ambient conditions comprising
   a) a polyisocyanate component,
   b) an aldimine based on the reaction product of a polyamine having 2 or more primary amino groups with an aldehyde corresponding to the formula:

O=CHCH(R$_1$)(R$_2$)

wherein R$_1$ and R$_2$ may be the same or different and represent optionally substituted hydrocarbon radicals, or R$_1$ and R$_2$ together with the β-carbon atom form a cycloaliphatic or heterocyclic ring and
   c) 0.01 to 1 weight percent, based on the weight of components a) and b), of a dialkyl tin(IV) compound which increases the reaction rate between isocyanate and hydroxyl groups by a factor of 100 when present in an amount of 1 mole percent in comparison to the reaction of these groups in the absence of a catalyst, wherein components a) and b) are present in an amount sufficient to provide an equivalent ratio of isocyanate groups to aldimine groups of 0.8:1 to 3:1.

14. The composition of claim 13 wherein said polyisocyanate is a polyisocyanate adduct.

15. The composition of claim 13 wherein said polyisocyanate is a polyisocyanate adduct containing monoisocyanurate and monoallophanate groups in a ratio of 10:1 to 1:10.

16. The composition of claim 13 wherein said diamine comprises bis-(4-aminocyclohexyl)-methane.

17. The composition of claim 14 wherein said diamine comprises bis-(4-aminocyclohexyl)-methane.

18. The composition of claim 15 wherein said diamine comprises bis-(4-aminocyclohexyl)-methane.

* * * * *